United States Patent [19]

Sheldon, Jr.

[11] Patent Number: 5,412,930
[45] Date of Patent: May 9, 1995

[54] VEGETATION CUTTER FOR A COTTON HARVESTER

[75] Inventor: Donald H. Sheldon, Jr., Johnston, Iowa

[73] Assignee: Deere & Company, Moline, Ill.

[21] Appl. No.: 246,000

[22] Filed: May 19, 1994

[51] Int. Cl.$^6$ .............................................. A01D 46/18
[52] U.S. Cl. .................................................. 56/44; 56/41
[58] Field of Search ...................... 56/29, 40, 41, 44, 50

[56] References Cited

U.S. PATENT DOCUMENTS

| | | |
|---|---|---|
| 1,751,389 | 3/1930 | Bledsoe . |
| 1,828,534 | 10/1931 | Johnston et al. . |
| 2,696,070 | 12/1954 | Mitchell ........................... 56/40 X |
| 3,043,075 | 7/1962 | Hubbard ........................... 56/40 |
| 3,175,346 | 3/1965 | Tracy et al. ...................... 56/44 |
| 3,402,538 | 9/1968 | Lester ............................. 56/44 |
| 3,451,201 | 6/1969 | Grichnik .......................... 56/44 |
| 4,761,941 | 8/1988 | Blackwood et al. ................. 56/36 |
| 4,819,415 | 4/1989 | Engelstad et al. .................. 56/41 |
| 5,014,502 | 5/1991 | Richman et al. ................... 56/41 |

*Primary Examiner*—George A. Suchfield

[57] ABSTRACT

A cotton harvester row unit attachment includes blade structure attached to the bearing cap at the lower end of the doffer for rotation about the doffer axis. The blade structure projects radially from the doffer axis a distance generally equal to the radius of the doffers and slices vines and other debris that find their way into the row unit housing adjacent the doffer to prevent plugging.

16 Claims, 1 Drawing Sheet

VEGETATION CUTTER FOR A COTTON HARVESTER

BACKGROUND OF THE INVENTION

1) Field of the Invention

The present invention relates generally to cotton harvesters and, more specifically, to an attachment for cotton harvester for preventing vines and similar vegetation from causing plugging problems in cotton harvester row units.

2) Related Art

Cotton harvesters often operate in vine infested fields. Typically, vines get snagged by the row unit and dangle inside the unit near the doffer. As the vine dangles in this area, cotton builds upon the vine and eventually causes the unit to plug. Clearing the plugged unit can be very difficult and time consuming and reduce the productivity of the machine. The air system that moves the cotton from the doffer area towards the basket tends to draw other debris that also can cause blockages in the doffer area and downstream in the duct system.

BRIEF SUMMARY OF THE INVENTION

It is therefore an object of the present invention to provide an attachment for a cotton harvester row unit which overcomes the aforementioned problems.

It is a further object of the present invention to provide an attachment for a cotton harvester row unit which permits the cotton harvester to operate with decreased downtime and increased productivity in areas where vines or similar vegetation is present. It is still another object of the present invention to provide such an attachment which efficiently slices vines and other debris that enter the area near the doffer so that plugging of the unit is prevented or significantly reduced.

An attachment constructed in accordance with the teachings of the present invention includes blade structure attached to the lower portion of the doffer for rotation about the doffer rotational axis. The blade structure projects radially from the doffer axis a distance generally equal to the radius of the doffers and slices vines and other debris that find their way into the row unit housing adjacent the doffer. The slicing action of the blade structure prevents plugging of the unit.

The attachment includes two generally identical half-sections which are bolted around the cap at the lower end of the doffer column. The attachment is simple in construction and easy to install, and can be mounted on the doffer columns of most commercially available cotton harvesters. Each half-section is substantially the mirror image of the other half-section and includes both leading and trailing sharpened edges and can be reversed to change the leading edge for mounting flexibility and extended life.

These and other objects, features and advantages of the present invention will become apparent to one skilled in the art upon reading the following detailed description in view of the drawings.

DETAILED DESCRIPTION OF THE DRAWINGS

Figure 1:
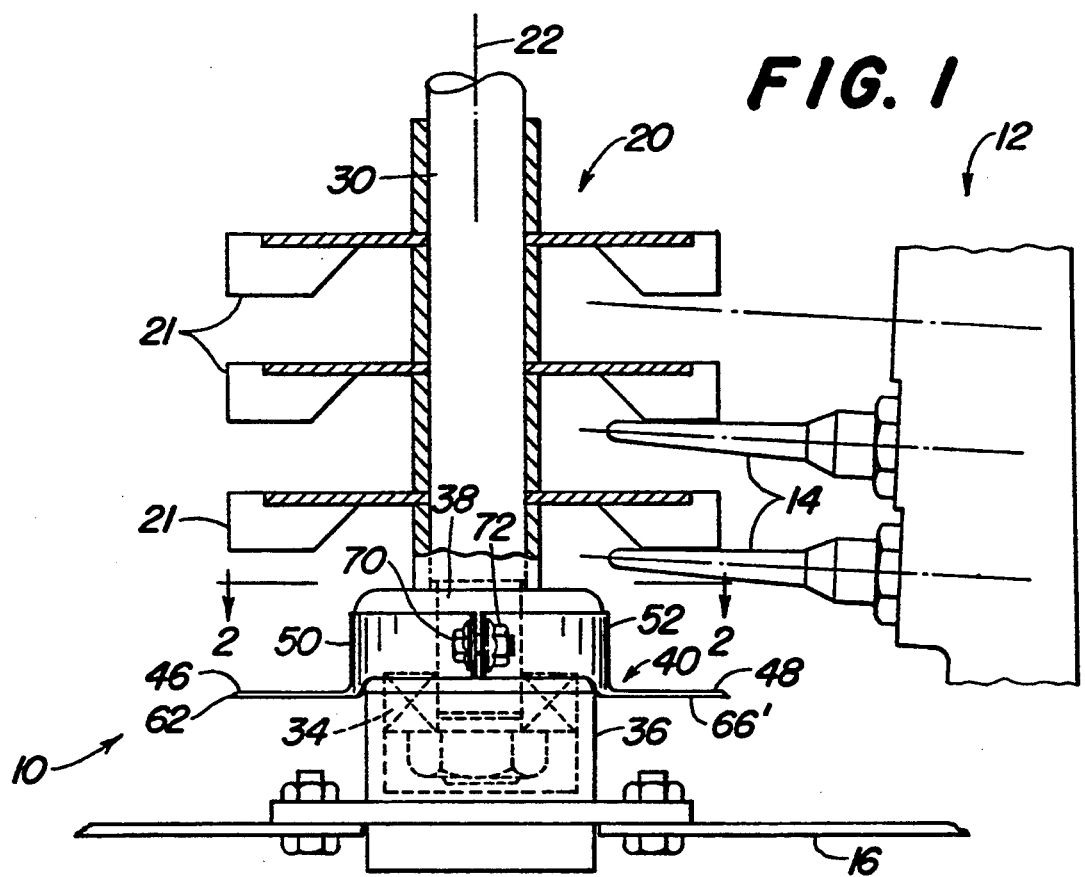
FIG. 1 is a view of the lower portion of a cotton harvester doffer unit including a blade structure connected thereto.

Referring now to FIG. 1, therein is shown a portion of a conventional cotton picker row unit 10 having an upright picker drum 12 with spindles 14 supported for rotation within the row unit housing between a lower horizontal floor 16 and intermediate panel structure (not shown). A doffer column 20 with vertically spaced doffers 21 is supported for rotation about an upright axis 22 parallel to the axis of rotation of the picker drum 12 to doff cotton from spindles 14. Doffed cotton is directed into a door structure at the side of the unit and is propelled by an airstream towards a harvester basket.

The doffer column 20 includes a shaft 30 having an upper end rotatably supported adjacent upper panel structure and driven by a conventional drive arrangement (not shown) for rotation about the upright axis 22. The lower end of the doffer shaft 30 is rotatably supported by a bearing 34 carried in a bearing support 36 bolted to the floor 16. A downwardly opening cap 38, fixed to the shaft 30 for rotation therewith about the axis 22, extends downwardly around the bearing 34.

Figure 2:
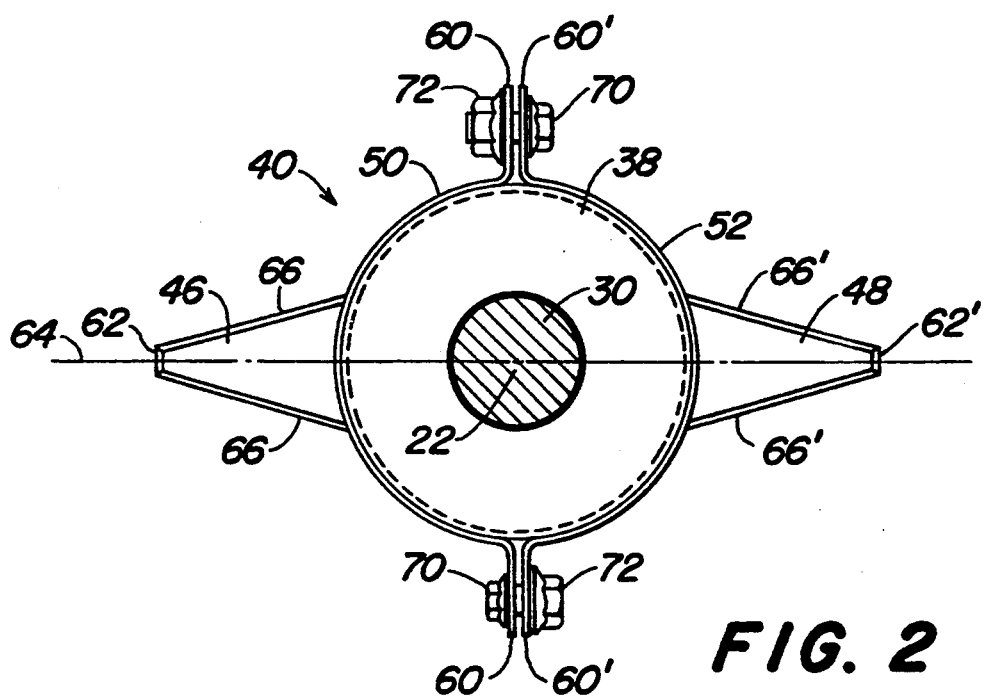
FIG. 2 is a top view of the blade cutter taken essentially along lines 2—2 of FIG. 1.

A vine and debris cutting attachment 40 is secured to the lower end of the doffer column 20 and is offset below the lowermost doffer 21 and below the bottom row of spindles 14. The attachment 40 as shown in FIGS. 1 and 2 includes bifurcated blade structure with first and second radially and generally horizontally disposed blade sections 46 and 48 attached to mounting portions 50 and 52, respectively. The blade structure is supported for rotation with the column 20 on opposite sides of the axis 22.

The structure 48, 52 is substantially the mirror image of the structure 46, 50 and so only the latter will be described in detail, with corresponding reference numerals for the structure 48, 52 indicated by a prime. The structure 46, 50 is fabricated from a unitary piece of annealed spring steel. The mounting portion 50 is generally in the shape of a half cylinder with radius approximately equal to the radius of the cap 38 and having a cylinder axis that is coextensive with the column axis 22 when the attachment 40 is mounted as shown. Apertured flanges 60 project radially from the ends of the half cylinder. At the bottom the half cylinder at a central location relative to the flanges 60, the blade 46 projects outwardly at a right angle to the cylinder axis. The blade 46 has an outermost tip 62 which located radially from the axis 22 a distance which is approximately equal to the radius of the doffers 21 so that the blade lies generally within an imaginary upright cylinder contains the doffers.

As shown in FIG. 2, the blade 46 has a longitudinal axis 64 perpendicular to the cylinder axis. The blade 46 is generally symmetrical about the axis 64 and includes opposite sharpened edges 66 so the attachment may be rotated either direction for slicing trash and debris. The edges 66 converge from the area of connection of the blade 46 with the mounting portion 50 towards the tip 62.

The attachment 40 is secured to the doffer column 20 by placing the mounting portions 50 and 52 over the cap 38 with the blades 46 and 48 projecting outwardly adjacent one vertical extremity of the cap (the lower edge as shown in FIG. 1) and with the apertures in the flanges 60, 60' aligned and in close proximity to each other. Screws 70 are then inserted through the aligned apertures in the flanges 60, 60' and self-locking nuts 72 are threaded onto the screws 70 to clamp the portions against the cap 38 so that the blades 46 and 48 are supported at a central location between the floor 16 and the bottom row of spindles 14.

As the unit works in areas where vines or other elongated debris is present, the rotating blades 46 and 48 slice the material as it dangles near the doffer or as it passes the lower doffer area while being drawn into the cotton conveying door area by the action of the airstream which propels the harvested cotton toward the basket. The slicing action prevents vines from remaining in the doffer area to catch cotton and helps to reduce debris to a size that is less likely to bridge an area and get caught in the conveying system.

Having described the preferred embodiment, it will become apparent that various modifications can be made without departing from the scope of the invention as defined in the accompanying claims.

I claim:

1. In a cotton harvester having a row unit with upright harvesting drum and an upright doffer column connected for rotation about an upright axis adjacent the drum and including a plurality of vertically spaced doffers of preselected radius, a vegetation cutting device for preventing row unit plugging comprising:
    a blade structure having a sharpened cutting edge; and
    means connecting the blade structure to the doffer column for rotation with the doffer column with the edge extending from the doffer column axis.

2. The invention as set forth in claim 1 wherein the blade structure is offset vertically from one of the doffers.

3. The invention as set forth in claim 2 wherein blade structure is located below a doffer which is lowermost on the doffer column.

4. The invention as set forth in claim 1 wherein the blade structure extends radially from the column axis a distance approximately equal to the preselected radius of the doffers.

5. The invention as set forth in claim 1 wherein the blade structure includes at least first and second individual blade sections, and the means connecting the blade structure includes connectors for securing the blade sections together on diametrically opposite sides of the column axis.

6. The invention as set forth in claim 1 wherein the blade sections have opposed sharpened edges and an outermost tip, wherein the edges converge toward the tip.

7. The invention as set forth in claim 5 wherein the blade sections are substantially disposed in a plane parallel to the sharpened edge.

8. The invention as set forth in claim 7 wherein the means connecting the blade structure comprises a cylindrically shaped flange offset vertically from the plane of the blade structure.

9. The invention as set forth in claim 8 wherein the column includes a bearing cap and the flange is secured to the bearing cap with the blade structure extending in generally a horizontal plane from the cap.

10. In a cotton harvester row unit having a row unit housing with a floor and with an upright harvesting drum and an upright doffer column adjacent the drum including a shaft connected for rotation about an upright axis and supporting a plurality of vertically spaced doffers above the floor, a cutting device for preventing row unit plugging comprising:
    a blade structure having a sharpened cutting edge and mounted on the shaft for rotation with the doffer column with the edge extending radially from the shaft for cutting debris adjacent the doffer column.

11. The invention as set forth in claim 10 wherein the blade structure comprises a flat blade lying substantially in a plane perpendicular to the upright axis.

12. The invention as set forth in claim 11 wherein the flat blade has a leading cutting edge in the direction of rotation which is angled rearwardly from a radial line extending from the upright axis.

13. The invention as set forth in claim 10 wherein the blade structure includes first and second opposed sharpened cutting edges.

14. The invention as set forth in claim 13 including mounting structure for attaching the blade structure to the doffer column with either of the edges projecting in the direction of rotation of the doffer column.

15. The invention as set forth in claim 11 wherein the flat blade has a horizontally disposed longitudinal axis and the blade is symmetrical about the longitudinal axis.

16. The invention as set forth in claim 11 wherein the flat blade bisects the area between a lowermost doffer of the doffer column and the floor, and includes an outermost tip generally lying within a cylinder defined by the doffers.

* * * * *